United States Patent [19]

Runde et al.

[11] Patent Number: 5,211,079
[45] Date of Patent: May 18, 1993

[54] METHOD OF ADAPTIVE CONTROL FOR CLOSED THROTTLE DOWNSHIFT IN AN AUTOMATIC TRANSMISSION

[75] Inventors: Jeffrey K. Runde, Indianapolis, Ind.; John A. Hibner, Coldwater, Ohio; Joseph H. Hunter, Carmel, Ind.

[73] Assignee: General Motors Corporation, Detroit, Mich.

[21] Appl. No.: 463,718

[22] Filed: Jan. 11, 1990

[51] Int. Cl.⁵ .............................................. F16H 61/06
[52] U.S. Cl. .................................... 74/866; 364/424.1
[58] Field of Search ........................ 74/866; 364/424.1

[56] References Cited

U.S. PATENT DOCUMENTS

| | | | |
|---|---|---|---|
| 4,653,350 | 3/1987 | Downs et al. | 74/866 X |
| 4,698,763 | 10/1987 | Smyth | 74/866 |
| 4,707,789 | 11/1987 | Downs et al. | 74/866 X |
| 4,843,922 | 7/1989 | Kashihara | 74/866 |
| 4,870,581 | 9/1989 | Ito et al. | 74/866 X |
| 4,875,391 | 10/1989 | Leising et al. | 74/866 |
| 4,922,425 | 5/1990 | Mack et al. | 74/866 X |
| 4,928,557 | 5/1990 | Takada et al. | 74/866 X |

*Primary Examiner*—Dirk Wright
*Attorney, Agent, or Firm*—Mark A. Navarre

[57] ABSTRACT

In an automatic transmission, clutch-to-clutch closed throttle downshifting is controlled by filling the on-coming clutch at a maximum pressure command for a set period while commanding the off-going clutch pressure to a low value and exhausting the off-going clutch before the end of the fill period. At the end of the fill period the on-coming pressure is set to an initial value and then ramped up until turbine speed is pulled up due to off-going clutch slippage. Then a closed-loop profile control period starts wherein the slip of the on-coming clutch is measured and controlled to a slip profile. When synchronization of the on-coming clutch is detected, maximum pressure is commanded. Parameters for controlling the quality of a shift such as on-coming clutch initial pressure and on-coming clutch fill time are automatically adjustable during vehicle use to correct shift aberrations which degrade shift quality.

11 Claims, 11 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

METHOD OF ADAPTIVE CONTROL FOR CLOSED THROTTLE DOWNSHIFT IN AN AUTOMATIC TRANSMISSION

FIELD OF THE INVENTION

This invention relates to an adaptive control method for an automatic transmission, and more particularly, to such an adaptive method of adjusting closed throttle downshift parameters on the basis of past shifts.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift is accomplished by disengaging a clutch associated with the lower speed ratio and engaging a clutch associated with the higher speed ratio, to thereby reconfigure the gear set to operate at the higher speed ratio. Shifts performed in the above manner are termed clutch-to-clutch shifts and require precise timing in order to achieve high quality shifting.

The quality of shift depends on the cooperative operation of several functions, such as pressure changes and the timing of control events. Certain parameters in the shift control can be recognized as key elements in determining the shift quality. The vehicle type and the engine characteristics are very important factors in the shift operation and influence the correct selection of the parameters. Moreover, manufacturing tolerances in each transmission, changes due to wear, variations in oil quality and temperature, etc., lead to shift quality degradation which can be overcome by an adaptive scheme for adjusting the parameters whereby as the vehicle is driven the shift quality is analyzed and the required adjustments are calculated and implemented for subsequent shifts.

Large calibration adjustments may need to be made for each shift of a newly manufactured transmission. It is important to provide the capability for the transmission control to rapidly adjust itself to its system configuration when it is first operated, as well as to maintain a continuous update capability.

SUMMARY OF THE INVENTION

It is therefore an object of the invention to provide a method of adaptively controlling a closed throttle downshift in an automatic transmission wherein a transmission aberration during a shift is diagnosed and the method has the capability to fully (or optionally, partially) correct the operation on the next closed throttle downshift between the same ranges.

It is a further object to provide such a method which is capable of making large corrections initially and is limited to small changes thereafter.

The invention is carried out by monitoring transmission input and output speeds during a closed throttle downshift, and identifying departures from acceptable speed patterns and the times during the shift when the departures occur. For closed-loop control, the relationship of commanded clutch pressures is similarly monitored. Each particular type of departure calls for a particular remedy, and a suitable adjustment is calculated based on the times and/or the commanded pressures at certain times, the adjustment being implemented by changing one or more initial conditions for the next shift of the same type. The adjustments may have to be large to make a full or significant partial correction at the next shift. Once sufficient corrections are made to effect shift convergence, large changes are inhibited and small increments are used instead.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer-based controller of FIG. 1a in carrying out the shift control of the transmission.

DETAILED DESCRIPTION OF THE INVENTION

Figure 1A:
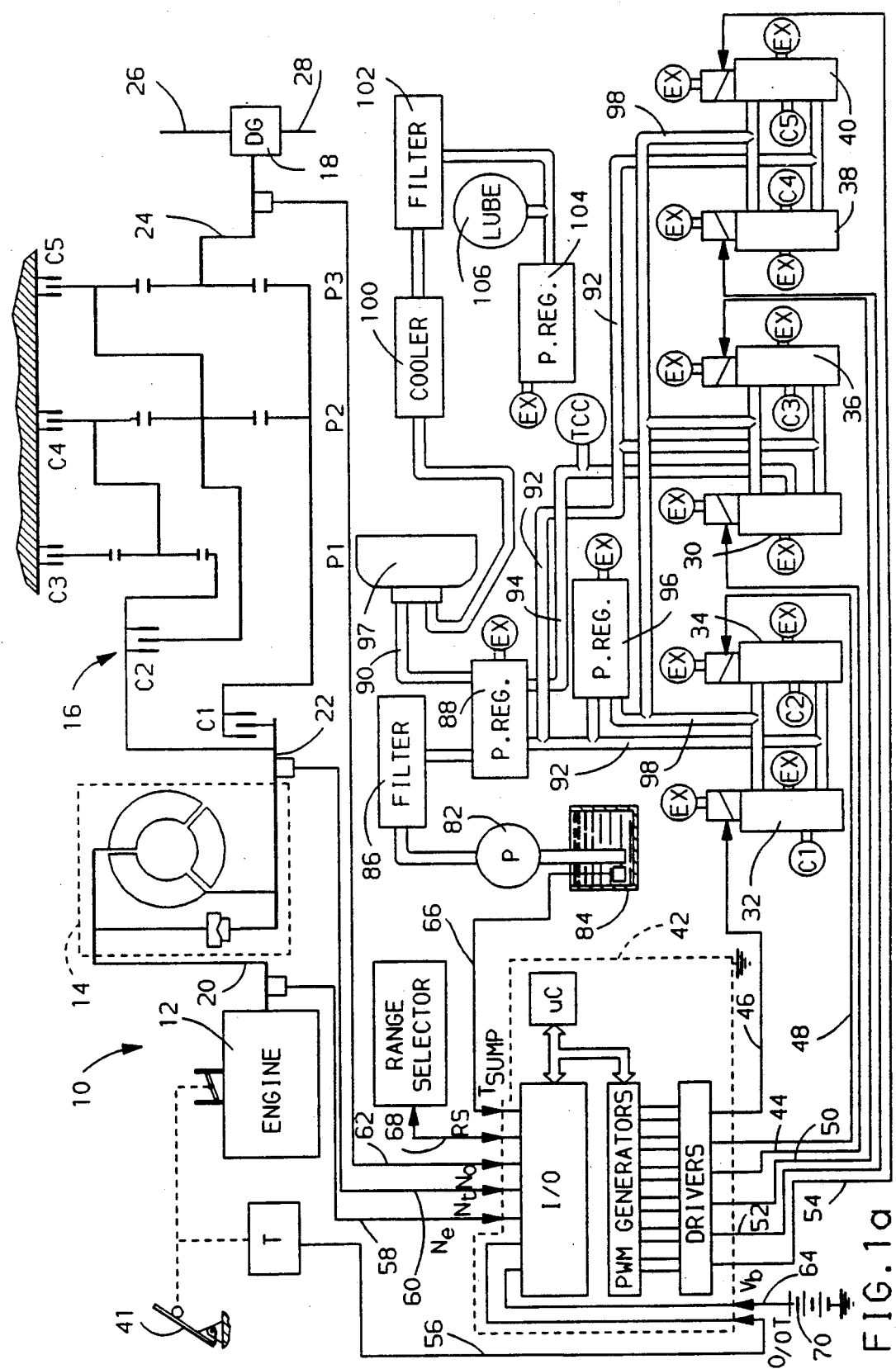
FIG. 1a is a system diagram of a fluid operated motor vehicle transmission, including several solenoid operated fluid pressure control valves, and a computer-based control unit for carrying out the control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lockup mode.

Figures 1B, 2:
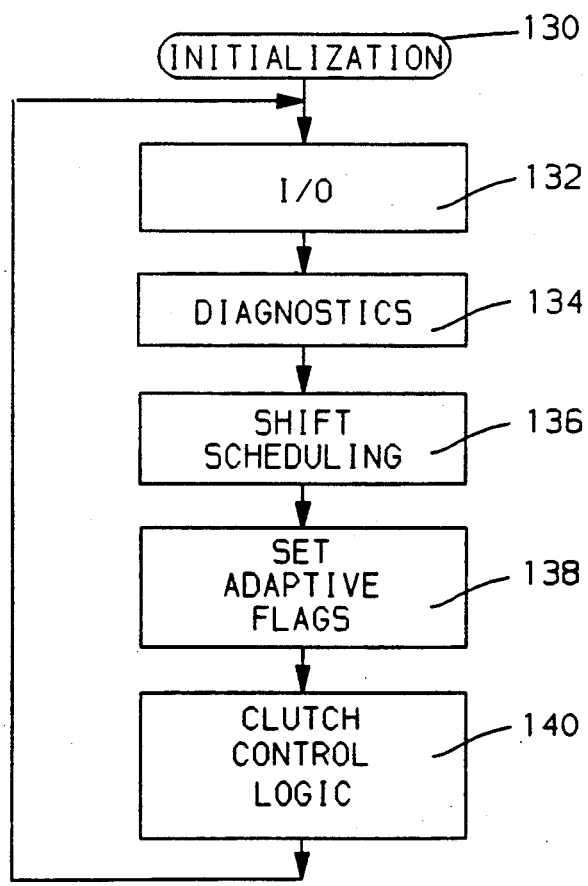

FIGS. 2, 3a-3b, 6a-6b, 8 and 11 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
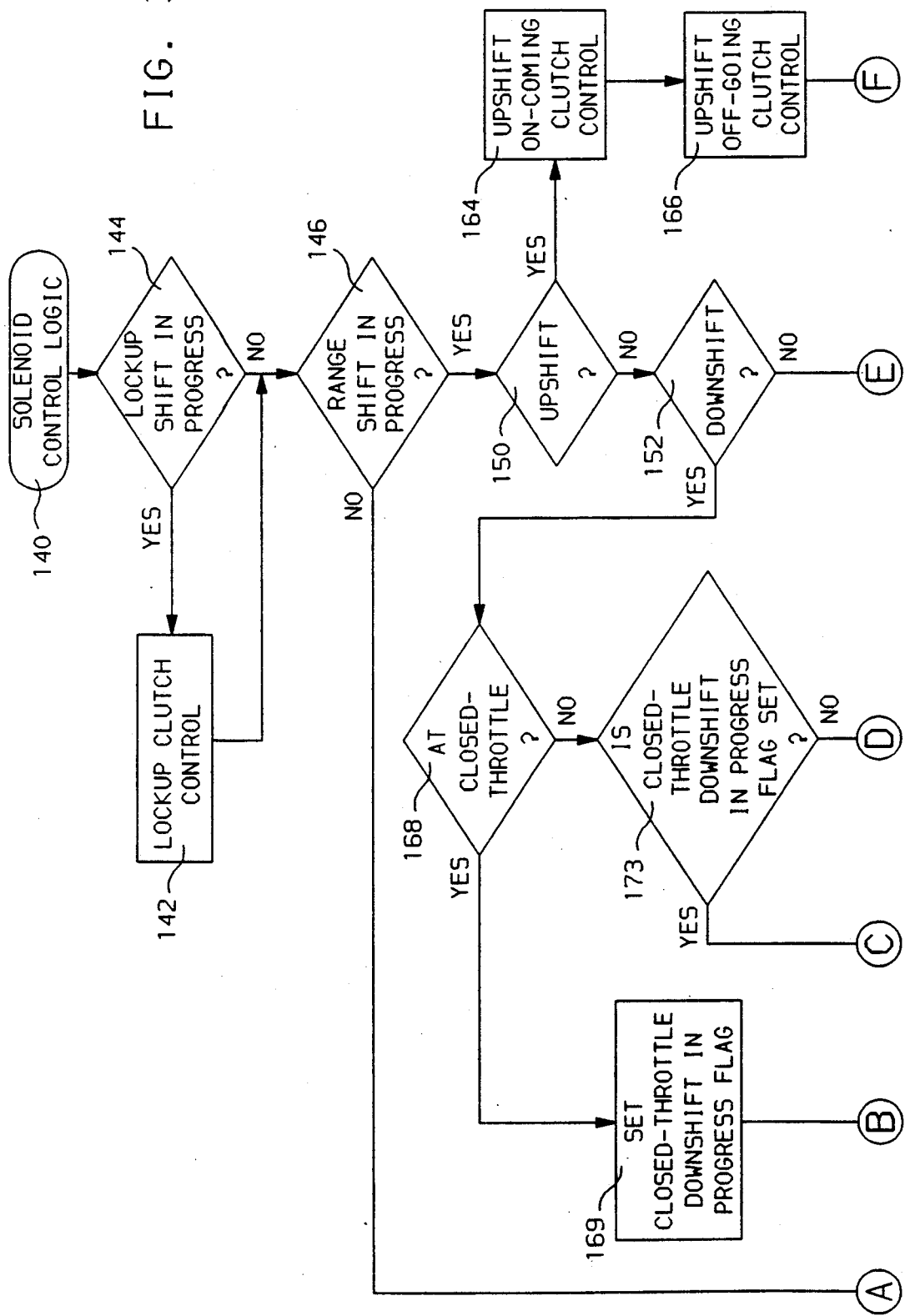
Figure 3B:
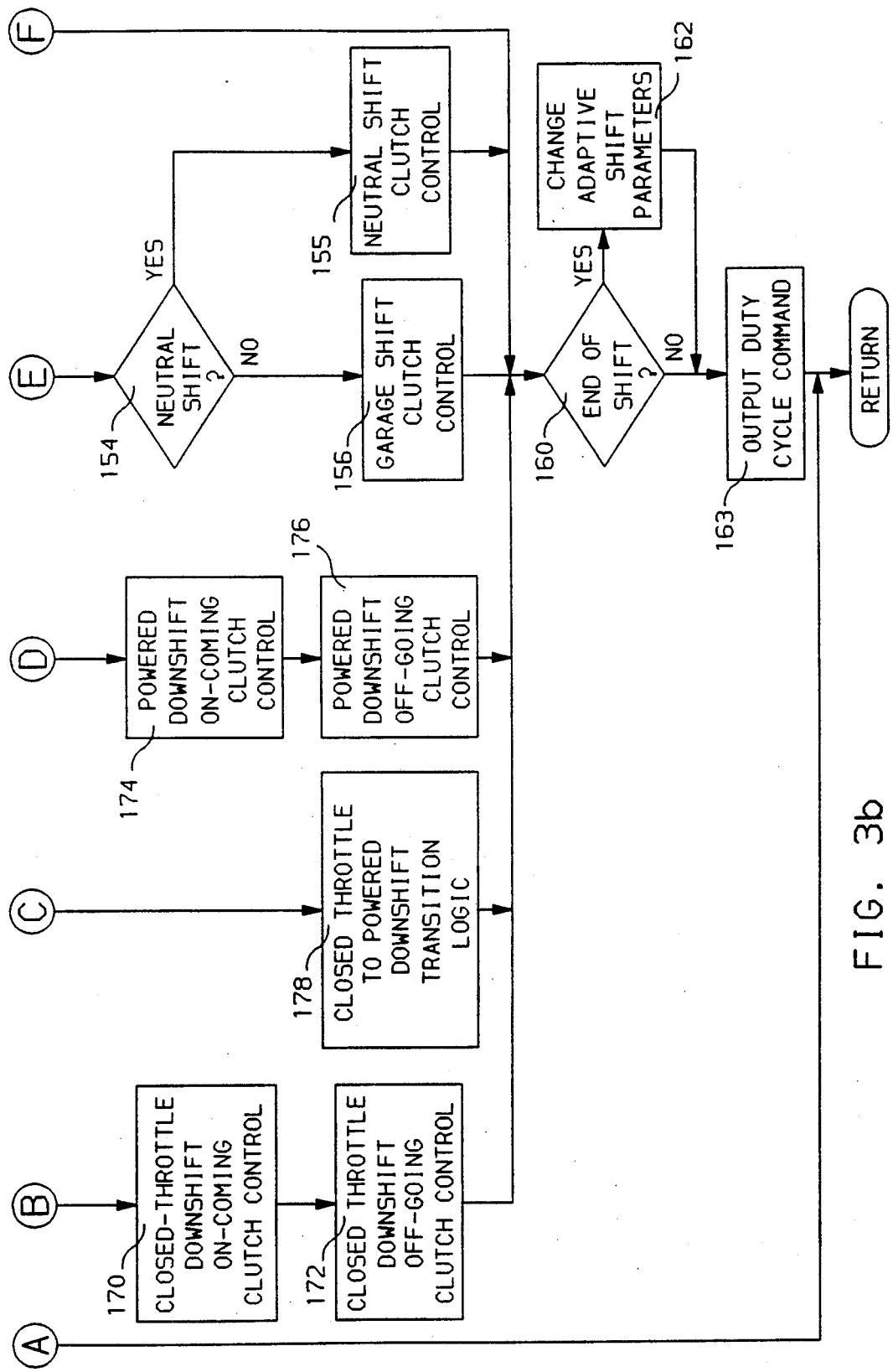

The flow diagram of FIGS. 3a-3b sets forth the program for making decisions as to the type of range shift in progress, if any, and determines the specific control for the on-coming and the off-going clutches. The program also checks whether a shift has performed within specifications. If not, certain shift parameters are changed at shift completion according to predefined adaptive logic to correct the shift. First, lockup clutch control is executed <142> if a lockup shift is in progress <144>, and it is then determined (from the shift schedule) whether a range shift is in progress <146>. If not, the clutch control logic is exited. If a range shift is in progress <146>, it is determined whether it is an upshift <150>, a downshift <152>, or a neutral shift <154>. If it is none of these, it must be a garage shift <156> which executes shifts from neutral to either drive or reverse and shifts from drive to reverse or from reverse to drive. If it is a neutral shift <154>, the neutral shift clutch control executes shifts from drive to neutral or from reverse to neutral <155>. The control flows from either the upshift, downshift, neutral shift or the garage shift block to the end-of-shift test <160>. Then, if the shift is completed <160>, adaptive shift parameters are changed if required <162>, and the duty cycle command is output <163>. If the shift has not ended <160>, the duty cycle command is output <163> before returning to the main loop (FIG. 2).

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle downshift, a CLOSED-THROTTLE IN PROGRESS flag is set <169>, the closed throttle on-coming clutch control is activated <170> and the closed throttle off-going clutch control is activated <172>. If the shift is not at closed throttle <168>, the CLOSED THROTTLE flag is checked <173>. If the flag is not set, the powered downshift on-coming clutch control is activated <174> and then the powered downshift off-going clutch control is activated <176>. If it is determined at block 173 that the CLOSED THROTTLE flag is set, the throttle opened during the course of the closed throttle downshift and a transition to powered downshift may be necessary; in this case, the transition logic is invoked <178>. Finally, the program goes to the end of shift test <160>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc., as well as each range shift, e.g., 1-2, 2-1, 4-3, 5-4, etc. Converter and lockup modes may also require separate sets of calibration values.

Figure 4:
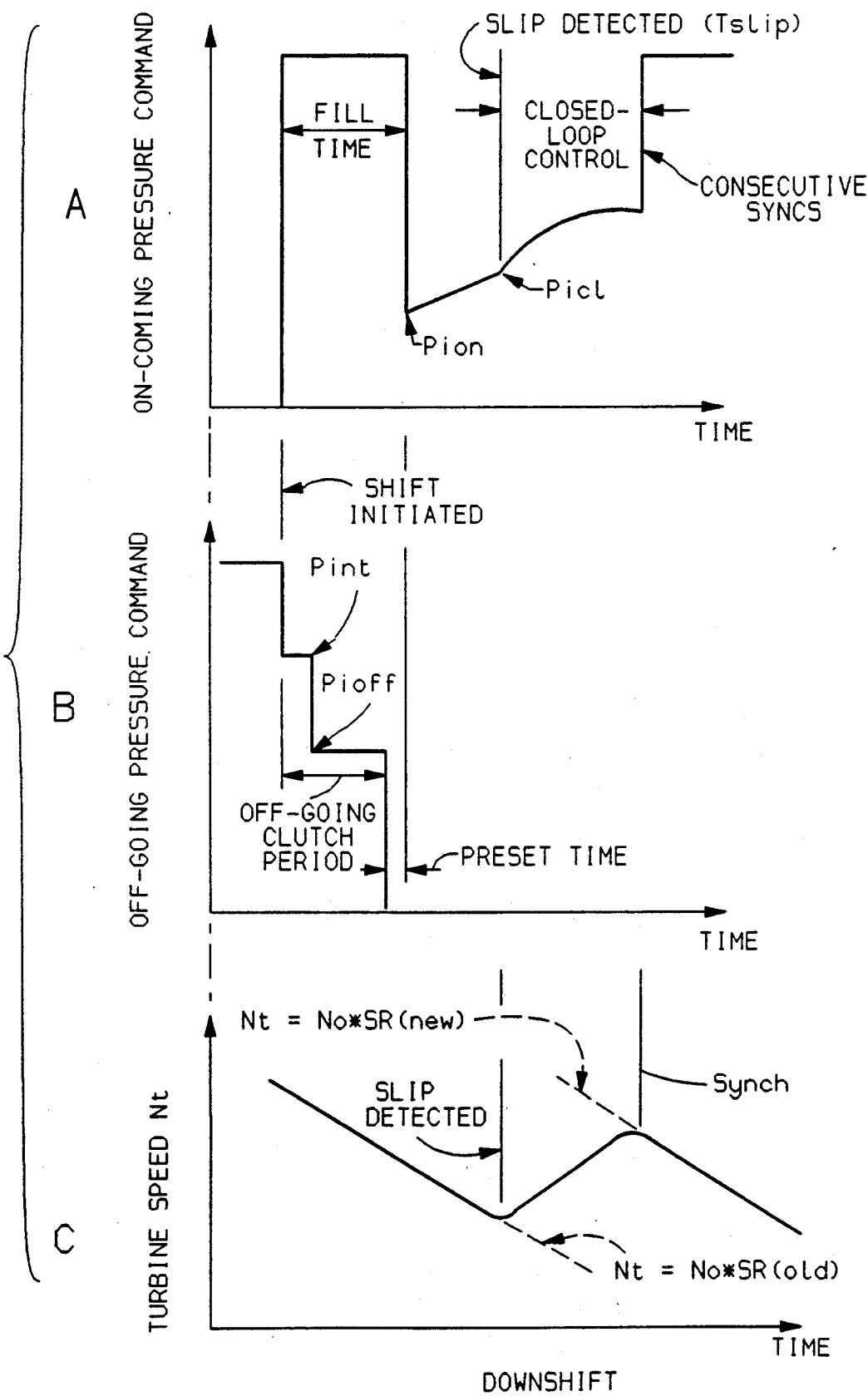
FIG. 4, graphs A, B and C, illustrate on-coming pressure command, off-going pressure command and turbine speed, respectively, for clutch-to-clutch closed throttle downshifting.

FIG. 4, graphs A, B and C, respectively, show the on-coming and off-going pressure commands for control of the on-coming and off-going clutches during a closed throttle downshift and the turbine speed Nt. At shift initiation, the on-coming pressure command is set to maximum for a fill time to prepare the on-coming clutch to accept torque. During the fill time, the off-going clutch pressure command is stepped to an intermediate value Pint for a set time and is then stepped to a lower value Pioff until a preset time before the end of the fill time. Thus, the fill time less the preset time determines the off-going clutch period. Then the off-going clutch is exhausted so that the on-coming clutch can take over when it is ready. The on-coming clutch pressure command is set to an initial pressure, Pion, and then ramped up until slip of the off-going clutch (or turbine pullup) is detected. Turbine pullup is a result of the beginning of off-going clutch slip. Pullup is detected by the turbine speed Nt becoming greater than the product of the output speed No and the old or lower speed ratio SR(old) plus a constant K1 or Nt>No * SR(old)+K1.

The off-going clutch slip triggers closed-loop control of the on-coming clutch pressure. The initial closed-loop pressure is Picl. The on-coming clutch slip is monitored and controlled to a calculated slip profile. This closed-loop slip profile control continues until on-coming clutch synchronization has been detected for several consecutive times. Synchronization is detected when the turbine speed is within a threshold value, K2, of the output speed times the new or high speed ratio, or ABS(Nt−No * SR(new))≦K2. The final closed-loop pressure is Pfcl.

Figure 5:
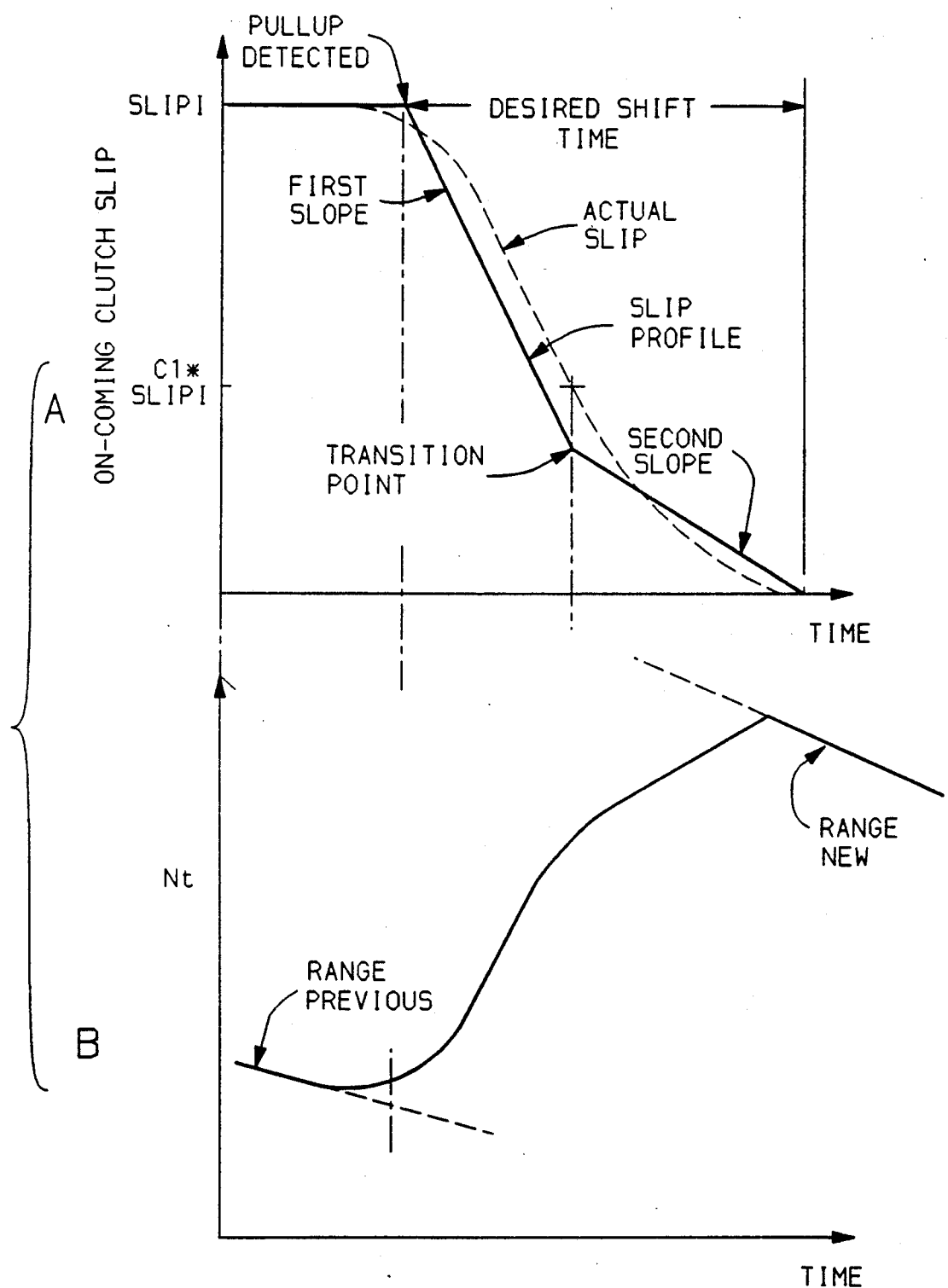
FIG. 5, A and B, illustrate the on-coming slip and a turbine speed for the on-coming closed-loop operation.

The closed-loop profile control is better explained with reference to FIG. 5, graph A, which shows the on-coming slip speed profile in solid lines and actual slip speed in dashed lines. Slip is determined by comparing the turbine speed to the output speed. Specifically, slip speed is the difference (times a conversion factor K3) between turbine speed and the product of the output speed, and the speed ratio of the higher or new range or SLIP=K3 * (Nt−No*SR(new)). Thus as soon as a shift command is issued there is slip in the on-coming clutch. The initial slip speed, SLIPI, is the absolute slip speed value at the initiation of closed-loop. The slip profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using slip speed as the control target, both turbine and output speeds are taken into account when controlling the shift duration.

To determine the slopes, three constants C1, C2 and C3 are defined. The constant C1 is a fraction of SLIPI at which the second slope begins; i.e., if SLIP≦C1*SLIPI, the slope changes to the second slope. The constant C2 is the desired time to utilize the first slope. The constant C3 is the desired overall closed-loop time. The constants C2 and C3 are used only for slope calculations and not for direct timing purposes. Thus, the first slope (SLOPE1) is given by SLOPE1=[SLIPI−(C1*SLIPI)]/C2. The second slope (SLOPE2) is given by SLOPE2=C1*SLIPI/(C3-C2).

Proportional control is carried out by correcting the on-coming clutch command pressure by a term which is proportional to slip speed error. The effect on turbine speed is shown in FIG. 5, graph B, where pullup is detected when turbine speed increases a certain amount above the lower dashed line which represents the product of output speed and speed ratio for the old range. Thereafter the turbine speed increases in accordance with the profile control where on-coming clutch slip is seen to be the difference (times a conversion factor) between the turbine speed curve and the upper dashed line, which represents the product of output speed and speed ratio for the new range. The arrival at synchronization speed is determined by detecting synchronization (sync) a preset number of times in consecutive-loops. This signals completion of the closed-loop profile control, and maximum pressure is applied to the on-coming clutch.

The control has several advantages. The initial off-going pressure intermediate value Pint reduces clutch pressure undershoot caused by solenoid dynamics. The lower off-going pressure Pioff is sufficient to maintain the old range and allows transition to off-going clutch control in the event of a throttle increase before the off-going clutch is exhausted. By exhausting the off-going clutch before the end of fill time it is assured that off-going clutch capacity is removed before application of the on-coming clutch and thereby eliminates clutch tie-up and associated shift quality degradation.

The off-going clutch slip is used to detect turbine pullup and thereby indicate that on-coming clutch capacity has been achieved. This automatically times the application of closed-loop control. The on-coming pressure command is ramped up following fill termination to achieve a timely turbine pullup when the initial on-coming command pressure is low. If the off-going clutch slip is detected during the fill period, the fill period is terminated early to reduce the overfill torque disturbance.

The closed-loop profile controls the on-coming clutch slip (rather than turbine speed) to insure that changes in output speed (due to braking) are also taken into account when controlling shift duration. The reduced slope, after a specified fraction of the initial on-coming clutch slip is achieved, reduces end of shift torque disturbance by more closely matching the acceleration rates on both sides of the on-coming clutch. Maintaining closed-loop control until sync has been detected in several consecutive control-loops assures that true sync has been achieved and maintained before full clutch application is made.

Adaptive Control

Adaptive control adjusts certain parameters for each type of shift independently of other types. That is, a 2-1 closed throttle downshift is treated separately from a 4-3 closed throttle downshift, and the shift quality of each is separately monitored and the parameters for each type are individually adjusted and stored. The process of adapting the parameters for a particular type of shift is on-going and proceeds during each shift of that type independently of the other types of shifts.

At the end of each completed shift, the block 162 sets adaptive conditions. This is accomplished in three phases: diagnosing the shift to identify input and/or output speed aberrations, determining whether fast or slow adaptive adjustment is permitted, and calculating new parameter values for the next shift. If fast adaptive adjustment (fast adapt) is permitted, a parameter value is calculated which is generally targeted to fully correct the aberration in the next shift. If slow adaptive adjustment (slow adapt) is required, the existing parameter is changed by a set increment. The system is capable of being programmed to make a partial correction in the fast adaptive mode and this is sometimes employed to avoid a possible "over correction".

The distinction between fast and slow adaptive adjustment is based on the need to make potentially large adjustments when a new or rebuilt transmission is initially operated in a given vehicle/engine combination as opposed to the need to make small updates due to clutch plate wear, engine performance degradation, oil viscosity degradation and the like during the life of the transmission. Initially the electronic control is set to make fast adaptive adjustments for each type of shift. As soon as all the parameters are correctly adjusted for that type of shift, as evidenced by a shift wherein no aberrations are detected, the shift calibration is said to be "converged" to an optimal solution and a memory flag is set to control future shifts of that type to the slow adaptive mode. Once the control enters the slow mode, it is assured that a misleading speed signal caused by system noises can not trigger a large adjustment when little, if any, adjustment is appropriate.

The diagnosis of shift aberrations is accomplished by monitoring key shift quality indicators during the shift and setting a memory flag whenever a certain speed change occurs under given conditions, a certain change of command pressure takes place, or certain corrective action has already been taken. Thus the shift pattern of the transmission is embodied in these indicators. Then by a logical assessment of the states of the several flags the presence of a given aberration is determined and a suitable adjustment can then be calculated.

Adaptive Flags

SLIP EARLY: Off-going clutch slip is detected within a set time window from the end of the fill period for a given number of times.

SLIP LATE: Off-going clutch slip is not detected within a set time window from the end of the fill period.

UNDERLAP DURING FILL: Underlap is detected before the end of the fill period. Underlap is the condition when $Nt < No*SR(old) + Ku$ occurs for a number of consecutive control loops where Ku is a negative calibration constant.

UNDERLAP AFTER FILL: Underlap is detected after the end of the fill period.

CLOSED-LOOP INCREASE (CLI): A closed-loop increase occurs when the commanded on-coming pressure at the first detected sync exceeds the initial closed-loop pressure command by a threshold amount.

CLOSED-LOOP DECREASE: A closed-loop decrease occurs when the commanded on-coming pressure at the first detected sync is below the initial closed-loop pressure command by a threshold amount.

HI DECEL: High output deceleration occurs when acceleration is less than a given amount at shift initiation.

HI TURBINE ACCEL: Following detection of off-going clutch slip, turbine acceleration is greater than a given amount for a set number of control loops.

SHORT SHIFT: Time from first slip of the off-going clutch to first sync is less than a set amount.

LONG SHIFT: Time from first slip of the off-going clutch to first sync is greater than a set amount.

SHORT CLOSED-LOOP: Time from first slip to first sync is less than a set amount (different from the set amount for the SHORT SHIFT).

PULL-DOWN LATE: If turbine flare is present, then the time to maximum turbine speed is greater than the fill time by a set amount. Flare is defined as $Nt > No*SR(new) + K$.

FILL TIME DECREASED: A memory flag which indicates that the fill time has been decreased within a calibration number of shifts.

FAST ADAPT OVERFILLS (FAO): A memory flag which indicates that corrections to overfills will use the fast adaptive calculation.

SHIFT CONVERGED: A memory flag which indicates that the shift calibration has converged to an optimal solution.

Adaptive Downshift Logic

The adaptive control for the closed throttle downshift adjusts the stored parameters corresponding to fill time, Tfill, initial on-coming pressure command, Pion, and off-going pressure command, Pioff. In the slow adaptive mode, pressure adjustments K2 are made to Pion and Pioff, and a time adjustment K1 is made to Tfill. In the fast adaptive mode, calculations are used to determine the amount of adjustment to decrease fill time, Tfill, and to adjust the initial on-coming pressure command Pion.

Figure 6A:
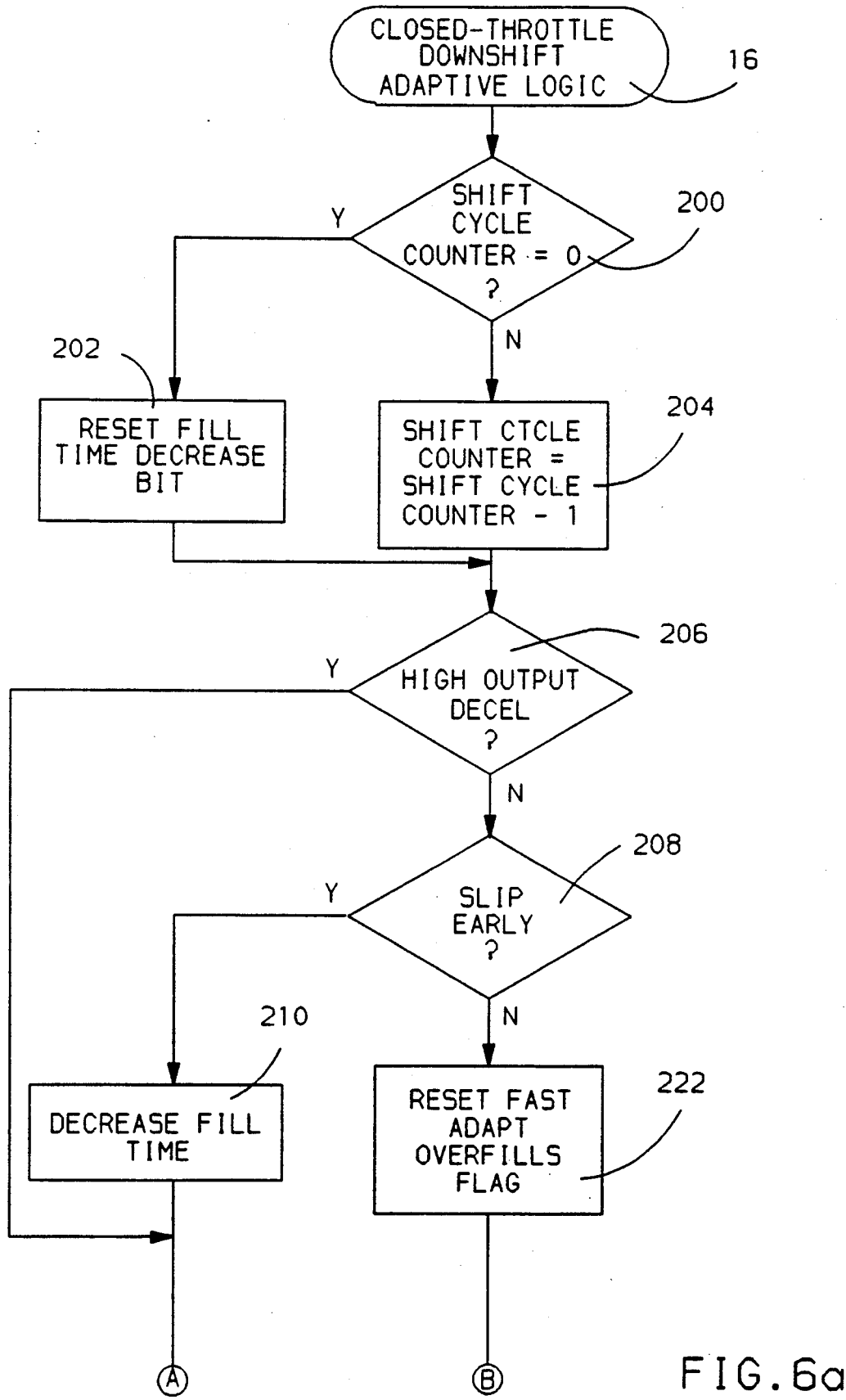
FIGS. 6a-6b, 8 and 11 are flow diagrams illustrating the adaptive clutch control logic for the closed throttle downshift, according to the invention.
Figure 6B:
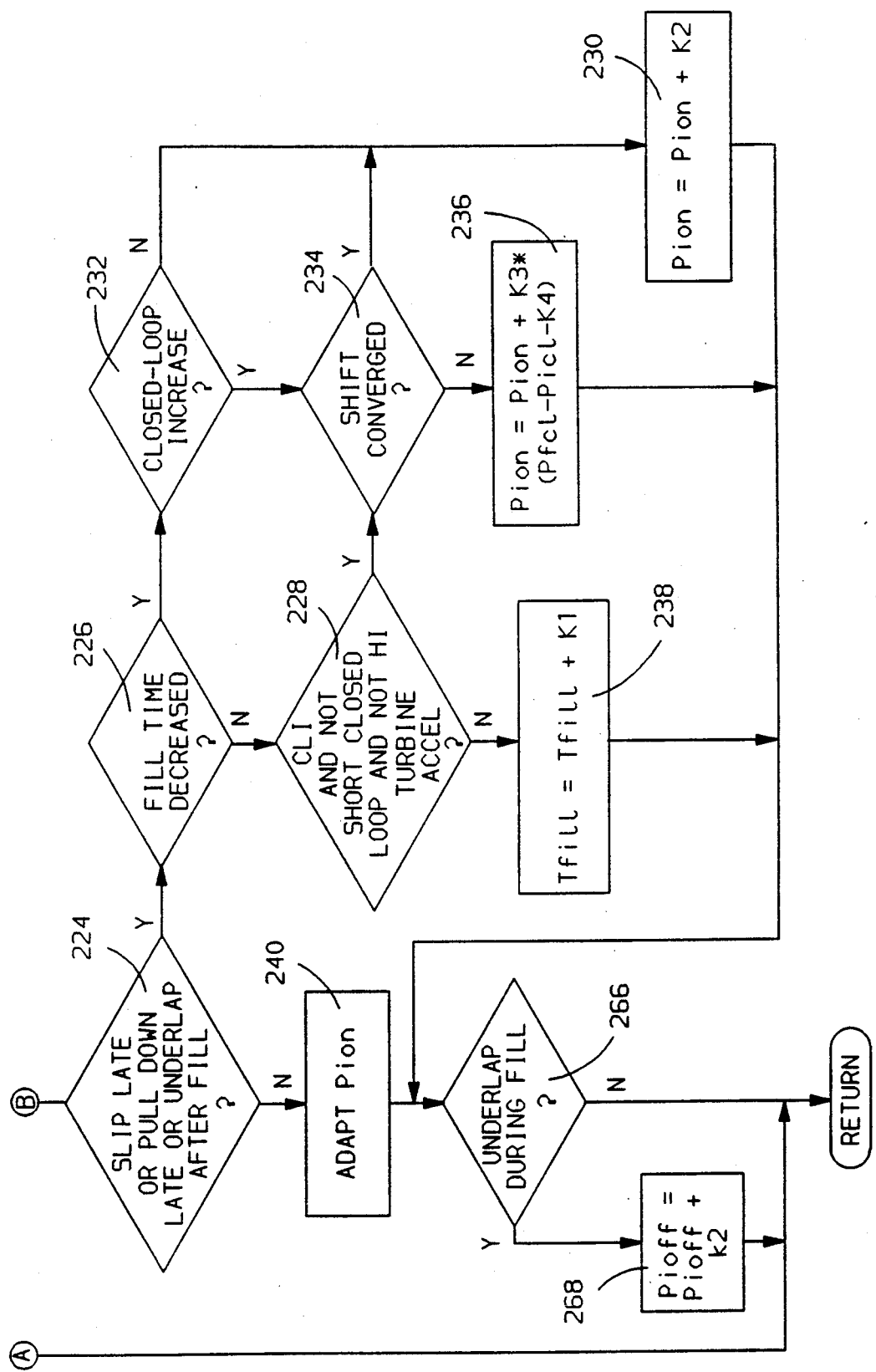

The flow diagram of FIGS. 6a–6b shows the progress of the adaptive closed throttle downshift program in block 162. If the shift cycle counter (SCC) is zero <200>, the FILL TIME DECREASED flag is reset <202>. If SCC is not zero <200>, it is decremented <204>. If the HIGH OUTPUT DECEL flag is set <206>, the adaptive program exits to the main program. This is done because sudden deceleration (such as caused by hard braking) can distort the speed signals and cause false flags to be set. If the HI OUTPUT DECEL flag is not set, the SLIP EARLY flag is tested <208>. If the flag is set, it is an indication of overfill of the on-coming clutch. Then the fill time is decreased <210> to correct the overfill condition.

Figure 7:
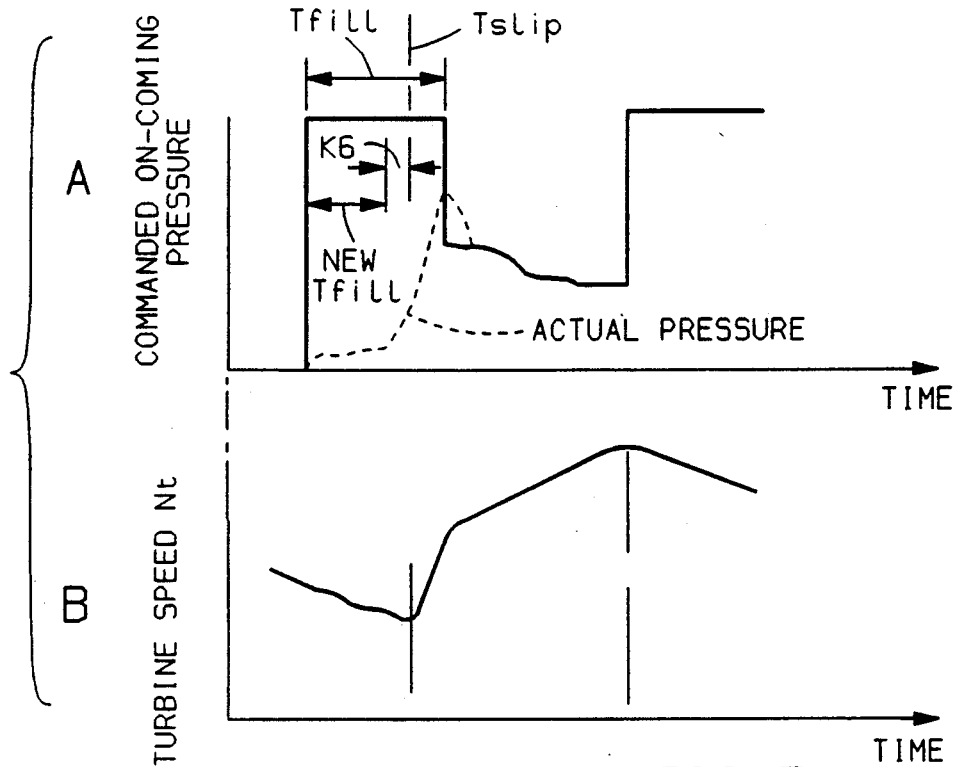
FIGS. 7, 9 and 10 are graphs of turbine speed and commanded on-coming clutch pressures for some of the aberrant shift conditions being corrected by the method of the invention.
Figure 8:
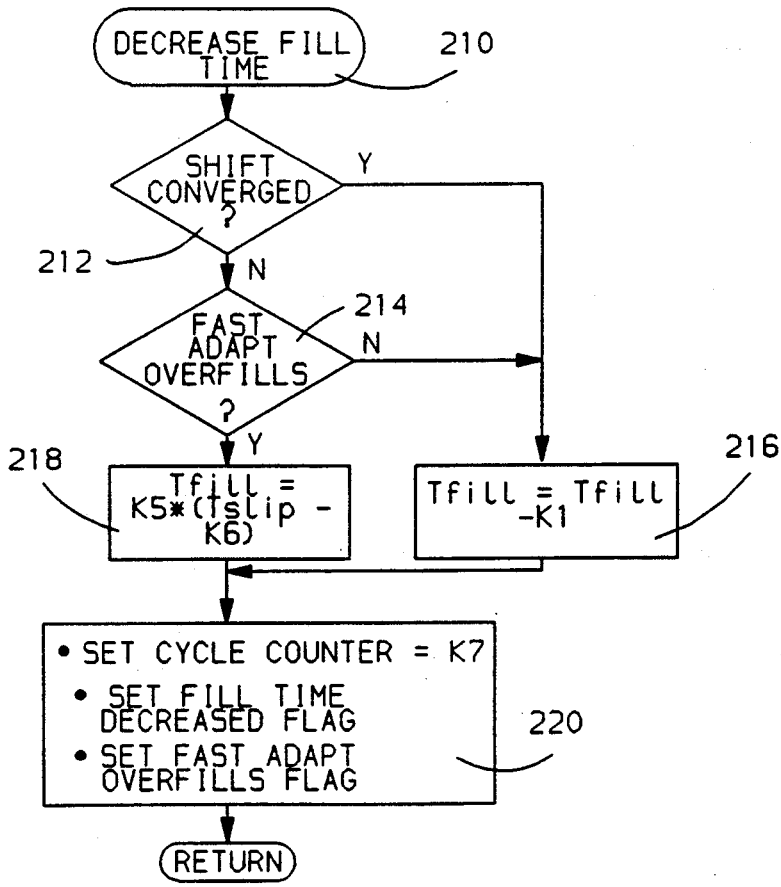

The overfill condition is illustrated in FIG. 7 which shows the actual pressure becoming large during the fill time causing turbine speed pullup at time Tslip during fill time. This condition sets the SLIP EARLY flag. The decrease fill time routine is shown in FIG. 8. If the shift has converged <212> or the FAST ADAPT OVERFILLS flag is not set <214>, the slow adapt mode is selected and the fill time is decremented by the value K1 <216>. Otherwise, the fast adapt mode is selected and the fill time is calculated as Tfill=K5*(Tslip−K6), where K5 is the percentage of the estimated fill time to be used, Tslip is the time after shift initiation when slip occurred, and K6 is a time offset from the detection of slip for the estimated fill time <218>. Thus, if K5 is chosen to be 100%, the new fill time will be set to expire the offset time K6 before slip occurs in the off-going clutch as indicated in FIG. 7. After the adjustment of Tfill, the Shift Cycle Counter is set to a value K7, the FILL TIME DECREASED flag is set and the FAST ADAPT OVERFILLS (FAO) flag is set <220>. Then the adaptive program is exited. The action in block 220 assures that the FILL TIME DECREASED flag will remain set until the number K7 of closed throttle downshifts between the same ranges have run.

Referring again to FIGS. 6a–6b, if there is no early slip <208>, the FAO flag is reset or cleared <222>. The FAO flag logic prevents the targeting of a large decrease in the fill time as a result of a noise disturbance. Initially, the FAO flag is set so that overfills will be adapted using the fast adaptive algorithm. However, once a shift is done where an overfill is not detected through the EARLY SLIP flag <208>, then the FAO flag will be reset <222>. If a later shift detects an overfill while the FAO flag is clear, then only a small decrease to the fill time will be allowed <214, 216>. The FAO flag will then be set <220> so that if a second consecutive overfill is detected, the fast adaptive change will be used.

After the FAO flag is reset <222>, block 224 detects the presence of an underfilled on-coming clutch. If the SLIP LATE flag, the PULL DOWN LATE flag or the UNDERLAP AFTER FILL flag is set, the clutch is diagnosed as underfilled. Blocks 226 and 228 determine whether the cause of underfill is a low fill time Tfill or a low initial on-coming pressure Pion. If the FILL TIME DECREASED flag is set <226>, then the fill time does not need to be increased and the on-coming pressure will be increased using the slow mode <230>, if there is no closed-loop increase <232> or if the shift is converged <234>. The fast adaptive algorithm 236 will be used if there is a closed-loop increase <232> and the shift is not converged <234>.

Figure 9:
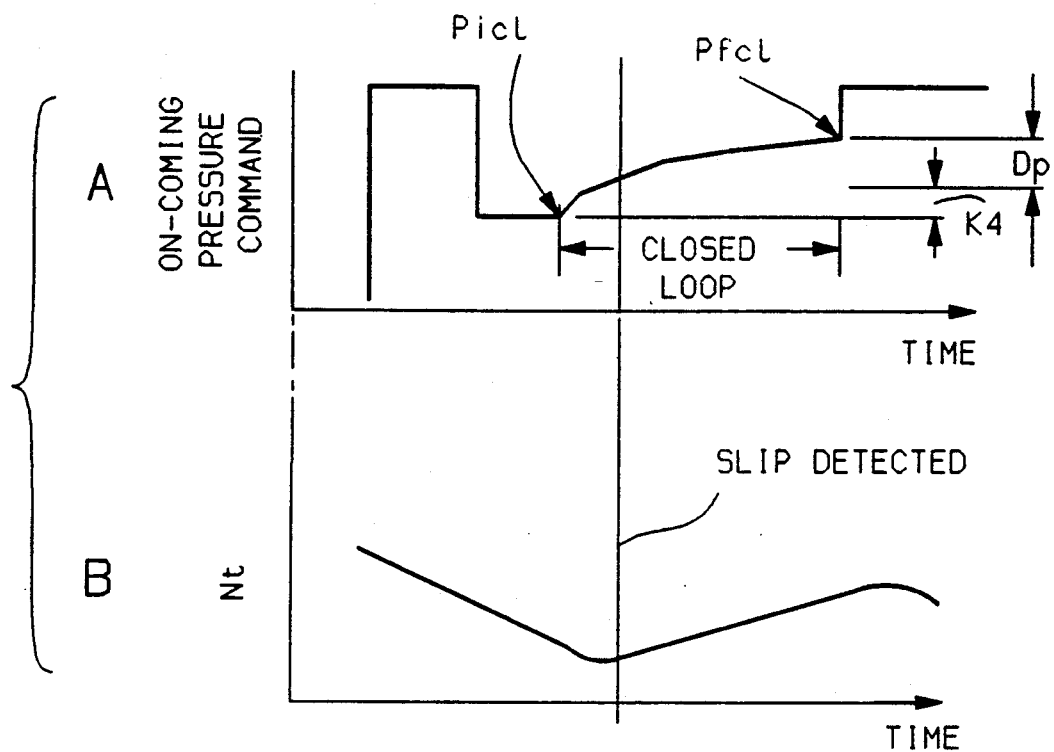

The fast adaptive algorithm for on-coming pressure is best described with reference to FIG. 9, graph A, which shows the on-coming pressure experiencing an increase during the closed-loop phase. The initial closed-loop pressure is Picl and the final closed-loop pressure is Pfcl. A programmed desired pressure increase is K4. The CLOSED-LOOP INCREASE flag is set when Pfcl-Picl exceeds a threshold. The full correction Dp of Pion is thus Pfcl-Picl-K4. If a partial correction is desired, a percentage K3 of the full value may be used. Thus the complete fast adaptive algorithm is Pion=Pion+K3*(Pfcl-Picl-K4) as set forth in block 236.

If the FILL TIME DECREASED flag is not set <226>, then block 228 is used to determine the cause of the underfill. If a CLI (CLOSED-LOOP INCREASE) flag is not set (or is not valid), then the on-coming pressure is assumed to be correct and the fill time is increased <238>. If a CLI flag is present and is valid, then the on-coming pressure must be too low and is therefore increased <236, 230>. This is illustrated in FIG. 9. In Graph A, the closed-loop phase begins before slip is detected due to a clock timeout from the end of fill. Graph B shows the turbine speed Nt (which is pulled up indicating clutch slip) after the closed loop begins. Thus, the SLIP LATE flag is set and the CLI flag is also set because of the pressure increase. Thus, the initial pressure Pion should be increased to bring about slip shortly after the end of the fill period.

Figure 10:
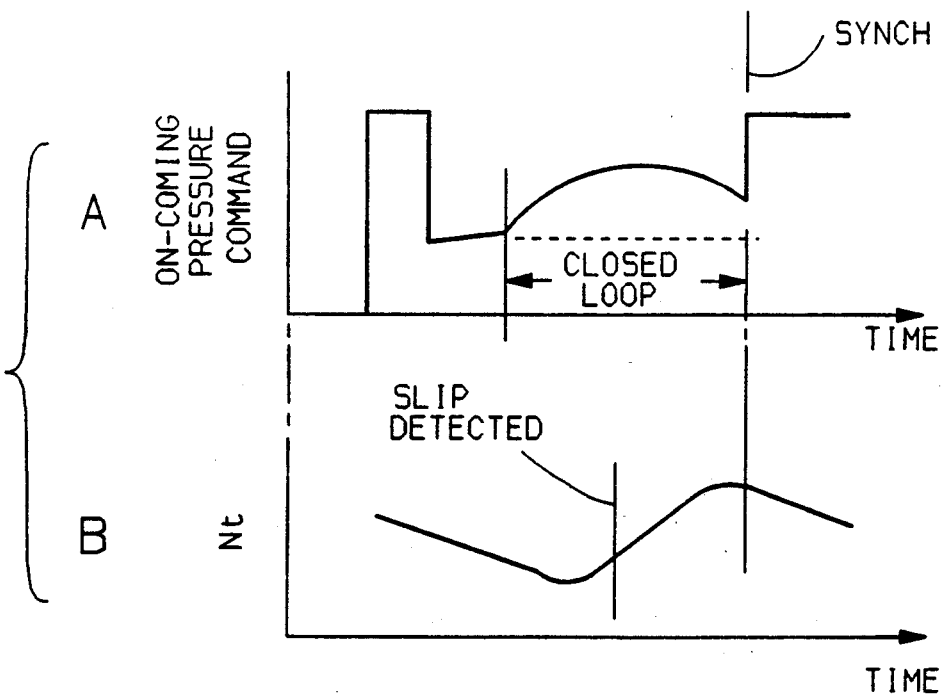

Two constraints, the SHORT CLOSED LOOP flag and the HI TURBINE ACCEL flag, are used to test for the validity of the CLI flag. The SHORT CLOSED-LOOP flag indicates that the shift was not in closed-loop long enough to ensure that the CLI flag is valid. This could happen when closed-loop is initiated following a timeout condition from the end of fill. This is shown in FIG. 10, Graphs A and B. In this case, closed-loop pressure will begin to increase until slip occurs (i.e. turbine speed is pulled up). The short closed-loop period ends (sync occurs) before the on-coming pressure can decrease to the desired value. If the initial on-coming pressure was correct and the fill time was too short, the increase in initial on-coming pressure Pion during this period would therefore not be desirable. The SHORT CLOSED-LOOP flag is then used to indicate that the closed-loop increase was not valid. Additionally, the HI TURBINE ACCEL flag indicates that the on-coming pressure is too high, which contradicts a CLI flag. Thus, if either the SHORT CLOSED-LOOP flag or the HI TURBINE ACCEL flag is set, then the fill time is assumed to be the cause of the underfill. If this assumption is incorrect, the increase in fill time will cause an overfill to occur. Thus, after correcting for the overfill, the FILL TIME DECREASED flag will be set and will cause the initial on-coming pressure to be corrected.

Figure 11:
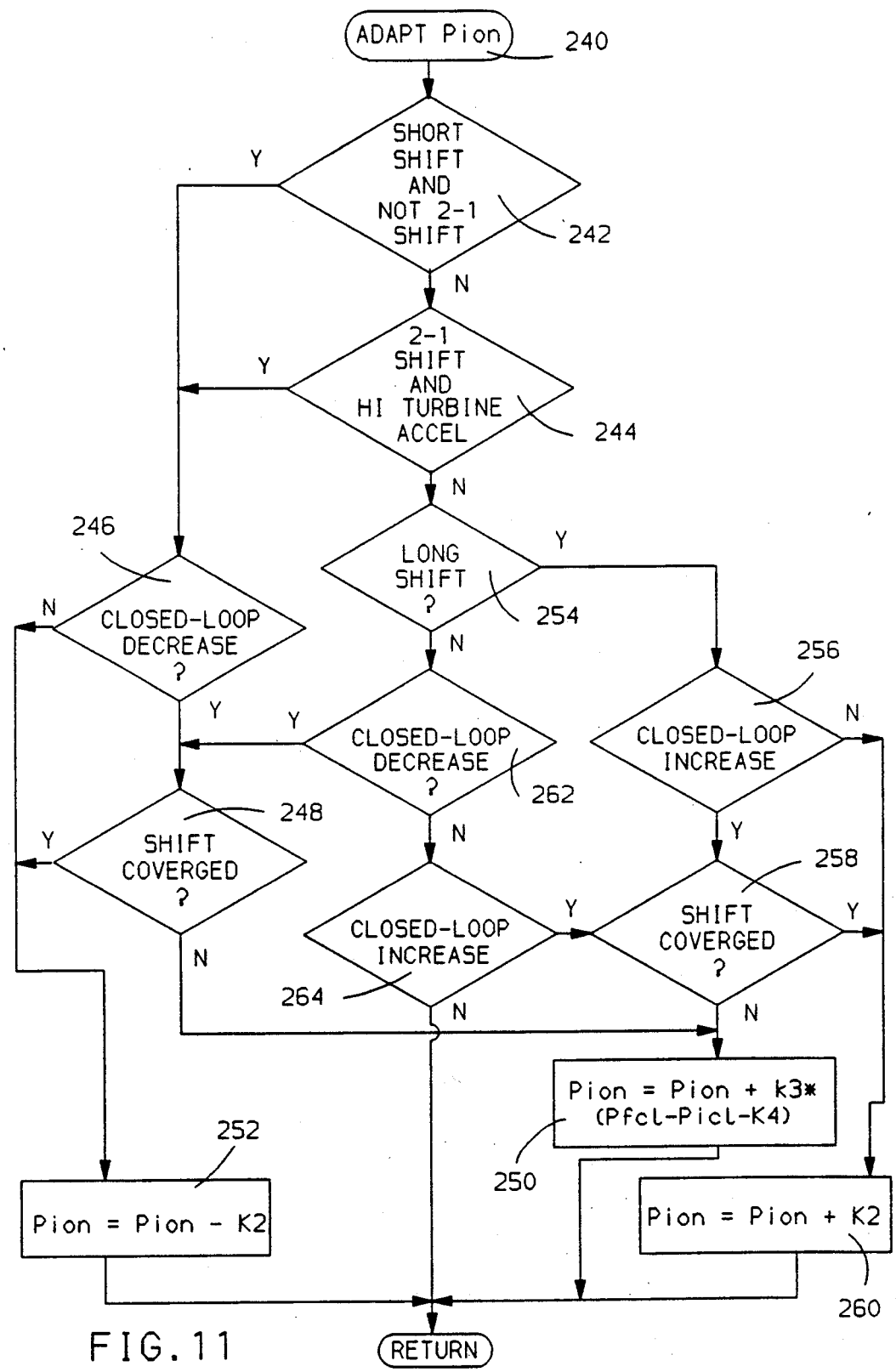

If the conditions tested in block 224 do not indicate an underfilled clutch, an Adapt Pion routine is entered <240>. As shown in FIG. 11, a test is made for high initial on-coming pressure Pion. For all shifts except a 2-1 shift, a SHORT SHIFT flag indicates high Pion <242>. A 2-1 shift is a special case because for that shift, the shift time is significantly dependent on output deceleration. High turbine acceleration is used to indicate a high initial on-coming pressure for the 2-1 shift <244>. When high Pion is thus determined, Pion is decreased. If the CLOSED-LOOP DECREASE flag is set <246> and the shift is not converged <248>, the same fast adapt calculation as in block 236 for Pion adjustment is used <250>; otherwise, the slow adapt calculation for pressure decrease is used <252>. If a LONG SHIFT flag is set <254>, a low initial on-coming pressure Pion is indicated. Then, if there is a closed-loop increase <256> and the shift is not converged <258>, the fast adapt pressure adjustment is used <250>; otherwise, the slow adapt pressure increase is used <260>. If there is no long shift <254>, there is a test for the CLOSED-LOOP DECREASE and the CLOSED-LOOP INCREASE flags <262, 264> and Pion is decreased or increased, respectively, if a flag is set. If neither flag is set, the program returns to the program of FIG. 6.

The final test in the adaptive program is for the flag UNDERLAP DURING FILL <266>. Underlap is detected by sensing when the turbine speed decreases a given amount below a value corresponding to the product of the output speed and the lower speed ratio. This condition implies that neither clutch is transmitting sufficient torque and the transmission is lapsing into neutral. When this occurs during clutch fill, it is an indication that the initial off-going pressure Pioff is too low. The pressure Pioff is then increased a small amount K2 <268>. Then the program returns to the main control program.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:
 disengaging the off-going torque transmitting device by reducing its pre-shift engagement pressure according to a predefined schedule to complete such disengagement;
 engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;
 detecting a significant increase in commanded pressure to the on-coming torque transmitting device during the period of the closed-loop control;
 testing the validity of the closed-loop increase determination; and
 subject to the validity test, adaptively adjusting a stored parameter corresponding to the setting of the initial pressure in a manner to increase such setting in response to the occurrence of a significant increase in the on-coming pressure during the closed-loop control.

2. The invention as defined in claim 1 including the step of:
 measuring the turbine acceleration and generating an indication when the acceleration is above a preset value; and
 wherein the step of testing the validity of the closed-loop increase determination includes determining that the determination is not valid when said indication has been generated.

3. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:
 disengaging the off-going torque transmitting device by reducing its pre-shift engagement pressure according to a predefined schedule to complete such disengagement;
 engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;
 detecting a significant increase in the commanded pressure to the on-coming torque transmitting device during the period of the closed-loop control;
 testing the validity of the closed-loop increase determination; and
 subject to the validity test, adaptively adjusting a stored parameter corresponding to the setting of the initial pressure in a manner to increase such setting in response to the occurrence of a significant increase in the on-coming pressure during the closed-loop control, the adjustment comprising a first value effective only prior to shift convergence and is a potentially large amount calculated from the detected increase in commanded pressure, and further comprises a second value which is a relatively small increment effective after shift convergence, wherein the event of shift convergence is evidenced by such a shift being executed without a parameter adjustment.

4. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:
 disengaging the off-going torque transmitting device by reducing its pre-shift engagement pressure according to a predefined schedule to complete such disengagement;

engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;

detecting an on-coming torque transmitting device underfill condition by sensing speed aberrations indicative of such underfill;

detecting a significant increase in commanded pressure to the on-coming torque transmitting device during the period of the closed-loop control;

detecting a short closed-loop period by comparing the closed-loop period with a preset value;

providing first and second mutually exclusive underfill correction methods;

the first method of correction comprising adaptively adjusting a first stored parameter corresponding to the setting of the initial pressure in a manner to increase such setting;

the second method of correction comprising adaptively adjusting a second stored parameter corresponding to the setting of the fill period in a manner to increase such setting;

selecting the first method of correction when a significant increase in commanded pressure is detected and a short closed-loop period is not detected; and selecting the second method of correction when a significant increase in commanded pressure is not detected or a short closed-loop period is detected.

5. The invention as defined in claim 4 wherein the step of detecting an on-coming torque transmitting device underfill condition comprises detecting underlap after the fill time as evidenced by a decrease in turbine speed below that which corresponds to the output speed at the higher speed ratio.

6. The invention as defined in claim 4 wherein the step of detecting an on-coming torque transmitting device underfill condition comprises detecting when flare is present and the time from the end of the fill period to maximum turbine speed is greater than a set amount.

7. The invention as defined in claim 4 including the step of detecting high turbine acceleration in excess of a set value, wherein the second method of correction is selected when high turbine acceleration is detected.

8. The invention as defined in claim 4 including the steps of:

detecting an on-coming torque transmitting device overfill condition by sensing speed aberrations indicative of such overfill;

correcting overfill in response to overfill detection by adjusting the second stored parameter corresponding to the setting of the fill period in a manner to decrease such setting; and on a subsequent shift when underfill is detected, selecting the first method of correction if a decrease in the fill period setting has already occurred.

9. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:

disengaging the off-going torque transmitting device by reducing its pre-shift engagement pressure according to a predefined schedule to complete such disengagement;

engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;

detecting a significant increase in commanded pressure to the on-coming torque transmitting device during the period of the closed-loop control;

testing the validity of the closed-loop increase determination;

if the testing indicates that the closed-loop increase determination is valid, adaptively adjusting a stored parameter corresponding to the setting of the initial pressure in a manner to increase such setting in response to the occurrence of a significant increase in the on-coming pressure during the closed-loop control; and if the testing indicates that the closed-loop increase determination is not valid, adaptively adjusting a stored parameter corresponding to the setting of the fill period in a manner to increase the fill period in response to the occurrence of a significant increase in the on-coming pressure during the closed-loop control.

10. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:

disengaging the off-going torque transmitting device by reducing its pre-shift engagement pressure according to a predefined schedule to complete such disengagement;

engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;

detecting a significant increase in commanded pressure to the on-coming torque transmitting device during the period of the closed-loop control;

detecting off-going device slip and on-coming device synchronization;

measuring the period between the detected slip and the detected synchronization and generating an indication when the measured period is less than a preset amount;

testing the validity of the closed-loop increase determination, and determining that such determination is not valid when said indication has been generated; and subject to the validity test, adaptively adjusting a stored parameter corresponding to the setting of the initial pressure in a manner to increase such setting in response to the occurrence of a significant increase in the on-coming pressure during the closed-loop control.

11. In a vehicular automatic transmission having an input and an output, a turbine connected to the input to couple driving torque thereto, in which a closed throttle downshift from one transmission speed ratio to another is carried out through concurrent disengagement of an off-going fluid pressure operated torque transmitting device associated with the lower of such speed ratios and engagement of an on-coming fluid pressure operated torque transmitting device associated with the higher of such speed ratios, and further having turbine and output speed sensing means, a method of operation comprising the steps of:

disengaging the off-going torque transmitting device by reducing its pre-shift engagement pressure according to a predefined schedule to complete such disengagement;

engaging the on-coming torque transmitting device by successively supplying it with hydraulic pressure for a predefined fill period, then setting the commanded pressure to an initial pressure and subsequently controlling the pressure by a closed-loop control to effect a progressive engagement of the same;

detecting a significant increase in commanded pressure to the on-coming torque transmitting device during the period of the closed-loop control;

testing the validity of the closed-loop increase determination, and determining that such determination is not valid when said indication has been generated;

subject tot he validity test, adaptively adjusting a stored parameter corresponding to the setting of the initial pressure in a manner to increase such setting in response to the occurrence of a significant increase in the on-coming pressure during the closed-loop control; and inhibiting the adaptive adjustment of said stored parameter when output acceleration is less than a preset value at shift initiation.

* * * * *